United States Patent
Kelly

(10) Patent No.: US 11,328,041 B2
(45) Date of Patent: May 10, 2022

(54) COMPUTING SYSTEM VIRTUALIZATION CONTINUOUS AUTHENTICATION SYSTEM

(71) Applicant: Dell Products L.P., Round Rock, TX (US)

(72) Inventor: John Kelly, Mallow (IE)

(73) Assignee: Dell Products L.P., Round Rock, TX (US)

( * ) Notice: Subject to any disclaimer, the term of this patent is extended or adjusted under 35 U.S.C. 154(b) by 102 days.

(21) Appl. No.: 16/775,153

(22) Filed: Jan. 28, 2020

(65) Prior Publication Data
US 2021/0232665 A1 Jul. 29, 2021

(51) Int. Cl.
*G06F 21/31* (2013.01)
*G06F 9/451* (2018.01)
*G06F 11/34* (2006.01)
*G06F 21/40* (2013.01)

(52) U.S. Cl.
CPC ............ *G06F 21/316* (2013.01); *G06F 9/452* (2018.02); *G06F 11/3438* (2013.01); *G06F 21/40* (2013.01)

(58) Field of Classification Search
CPC .................................................. G06F 9/45558
See application file for complete search history.

(56) References Cited

U.S. PATENT DOCUMENTS

| | | | |
|---|---|---|---|
| 2016/0094551 A1* | 3/2016 | Sugihara | H04L 63/0869 726/7 |
| 2018/0121030 A1* | 5/2018 | Hu | H04L 63/08 |
| 2018/0267820 A1* | 9/2018 | Jang | G06F 1/3209 |
| 2019/0327237 A1* | 10/2019 | Bar | H04L 63/102 |

* cited by examiner

*Primary Examiner* — Di Xiao
(74) *Attorney, Agent, or Firm* — Joseph Mencher

(57) ABSTRACT

A computing system virtualization continuous authentication system includes a computing system virtualization system that is configured to provide a virtual computing system on a computing client device, and a computing system virtualization management server device that is coupled to the computing system virtualization system and a management terminal. The computing system virtualization management server device monitors user activity information that is associated with a management session that corresponds with the management of the computing system virtualization system and that is associated with an authenticated user account on the computing system virtualization management server device. The computing system virtualization management server device determines that a first authentication challenge is required during the management session based on the user activity information and provides the first authentication challenge to the management terminal.

20 Claims, 5 Drawing Sheets

US 11,328,041 B2

COMPUTING SYSTEM VIRTUALIZATION CONTINUOUS AUTHENTICATION SYSTEM

BACKGROUND

The present disclosure relates generally to information handling systems, and more particularly to the continuous authentication of management sessions provided on computing system virtualization management systems that manage virtual computing systems provided on information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information Handling Systems such as, for example, virtual computing systems, may be provided via computing system virtualization techniques performed on desktop computing devices, laptop/notebook computing devices, and/or other client computing devices known in the art. For example, conventional computing system virtualization techniques may utilize the Virtual Desktop Infrastructure (VDI), which refers to a system of providing complete, centrally-managed virtual desktop computing systems to users using computer virtualization technology. VDI is often used to create relatively large numbers of independent virtual computing environments for relatively large numbers of users, with the virtual desktop computing system users grouped together based on similar software and computing needs. In VDI, each virtual desktop computing system is exported to the user from a virtual machine (VM) that may be assigned to the user, and virtual desktop computing system pools may be associated with resources available in a datacenter including, but not limited to, compute resources, memory resources, network resources, storage resources, and/or other datacenter resources known in the art. As such, limited computing device resources and computing device components are required in the client computing devices in order to communicate inputs with the virtual desktop computing system, display the virtual desktop computing system, as well as provide other inputs and outputs.

The virtual desktop computing systems discussed above may be grouped together in "virtual desktop computing system pools" that may be provisioned, managed, and deleted as single entities, with the control of such actions associated with a VDI management server device that provides a VDI management console to an administrator. As such, an administrator may access the VDI management server device in order to manage many virtual desktop computing systems, and in the event an unauthorized user gains access to the VDI management server device via an administrator account, that unauthorized user has the potential to cause great harm to an entire enterprise utilizing the VDI environment.

Accordingly, it would be desirable to provide a desktop virtualization authentication system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a computing system virtualization management engine that is configured to: monitor user activity information that is associated with a management session that corresponds with the management of a computing system virtualization system that is coupled to the processing system via a network and that is associated with an authenticated user account; determine that a first authentication challenge is required during the management session based on the user activity information; and provide the first authentication challenge to a management terminal coupled to the communication subsystem.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
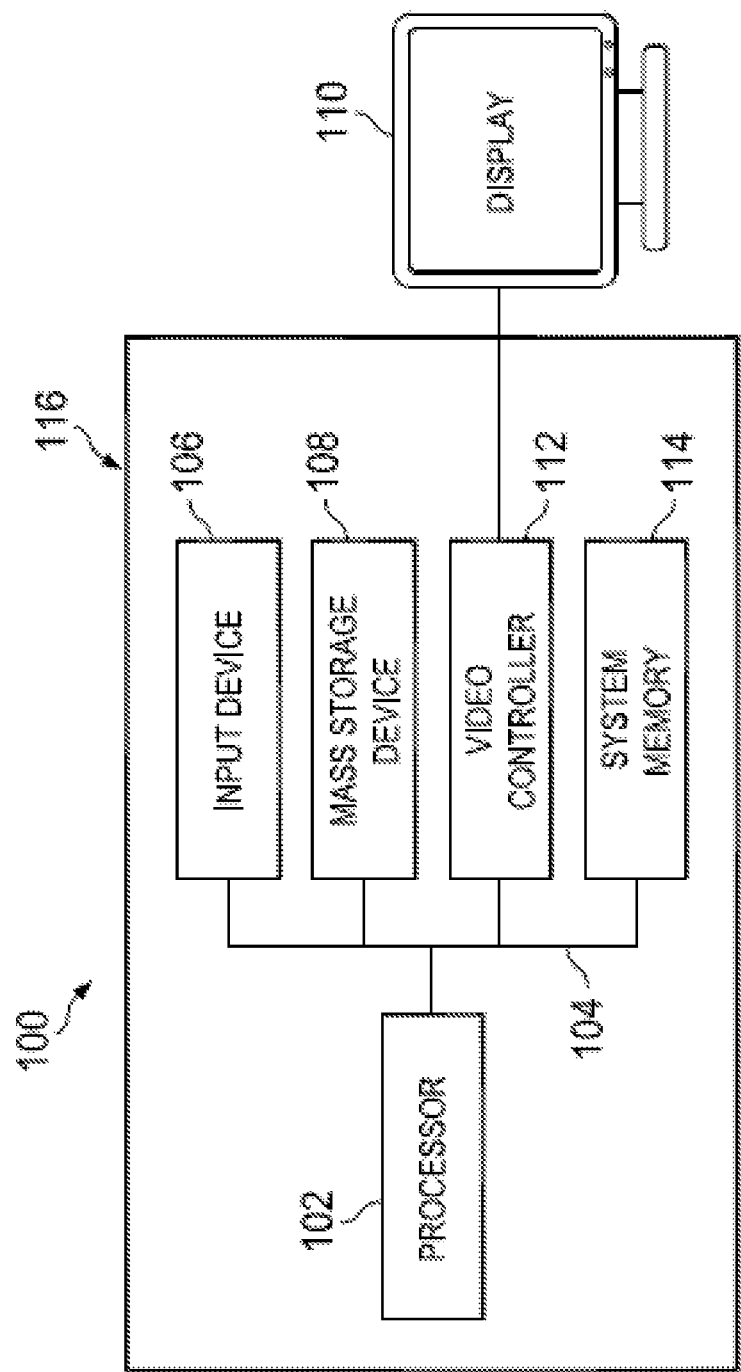
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
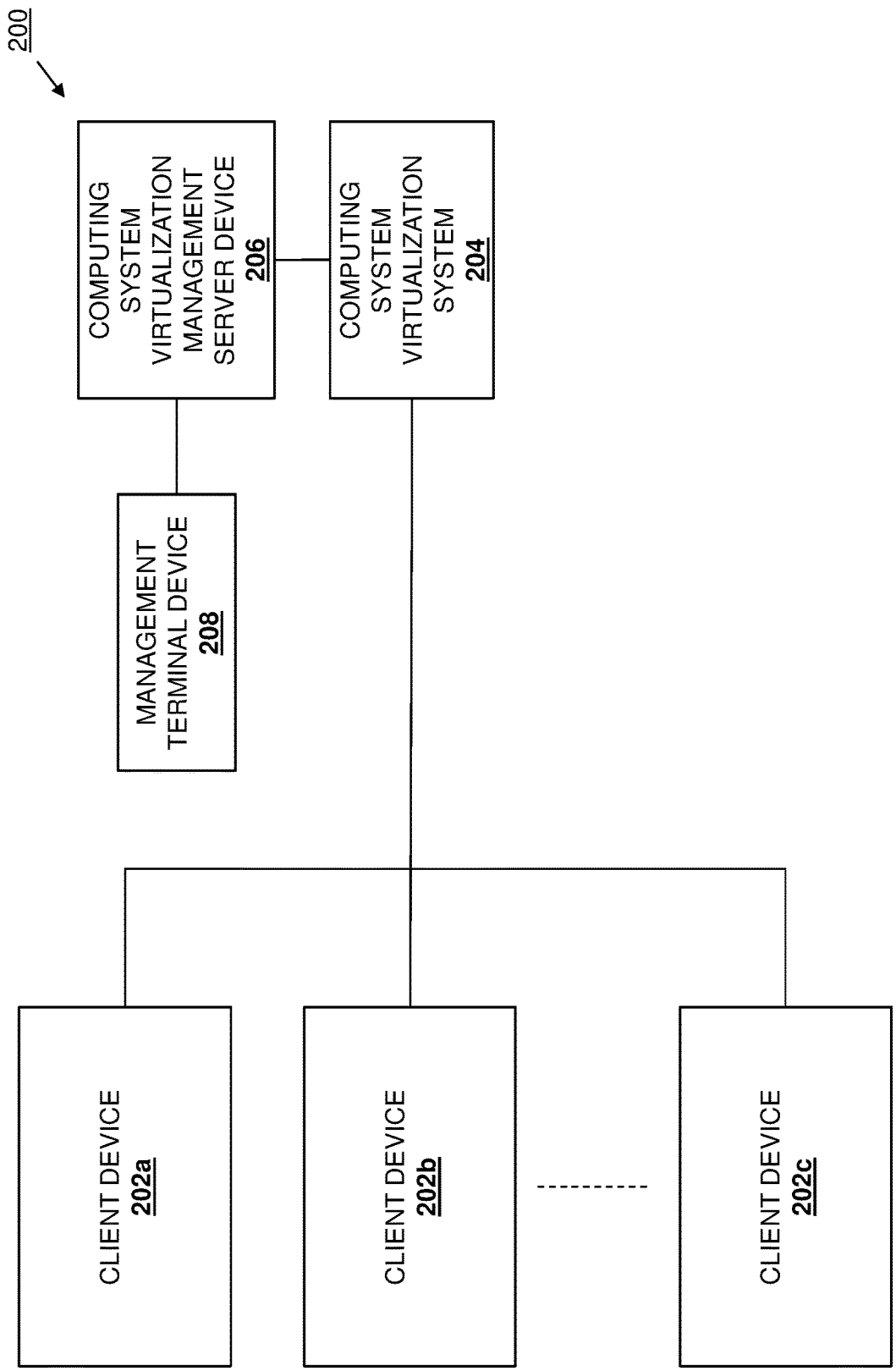
FIG. 2 is a schematic view illustrating an embodiment of a computing system virtualization continuous authentication system.

Referring now to FIG. 2, an embodiment of a computing system virtualization continuous authentication system 200 is illustrated. In the illustrated embodiment, the computing system virtualization continuous authentication system 200 includes or is provided in a computing system virtualization environment (e.g., a Virtual Desktop Infrastructure (VDI) environment) that includes a plurality of client computing devices 202a, 202b, and up to 202c. For example, any or all of the client computing devices 202a-c may be provided by the IHS 100 discussed above with reference to FIG. 1, and/or may include some or all of the components of the IHS 100. In the embodiments discussed below, the client computing devices 202a-c are described as end user computing devices such as desktop computing devices, laptop/notebook computing devices, tablet computing devices, mobile phones, and/or other end user computing devices known in the art. However, in other embodiments, the client computing devices 202a-c may be other types of computing devices such as a thin client computing device that includes components to receive outputs from a server device and provide inputs to the server device via a network, other computing devices that access applications via the computing system virtualization environment, as well as any other computing device that one of skill in the art in possession of the present disclosure would recognize as benefitting from the teachings below.

In the illustrated embodiment, the computing system virtualization continuous authentication system 200 also includes a computing system virtualization system 204 that may include one or more server devices that are coupled to the client computing devices 202a-202c directly, via a network (e.g., a Local Area Network (LAN), the Internet, a management network, combinations thereof, and/or via any other networks known in the art), and/or in any other manner that would be apparent to one of skill in the art in possession of the present disclosure. The computing system virtualization system 204 may be provided by the IHS 100 discussed above with reference to FIG. 1, and/or may include some or all of the components of the IHS 100. In the embodiments discussed below, the computing system virtualization system 204 is described as server device(s) that are configured to run applications that are accessed by the client computing devices 202a-c. In specific examples described below, the computing system virtualization system 204 is configured to run computing system virtualization application(s) that may be accessed by the client computing devices 202a-c and that operate to separate a computing system ("desktop") environment and associated application software from those physical client computing devices 202a-c. For example, a "virtual desktop" computing system may refer to any number of methodologies including server-based computing (SBC) where a number of users share the desktop of a server-based operating system Virtual Desktop Infrastructure (VDI), with each user provided their own virtual machine which typically runs a client operating system, and application virtualization technologies that operate to provide specific applications available to users that may, for example, be hosted on a remote system, or streamed to the user's local computing system. However, while systems and methods discussed below are discussed with respect to a VDI environment, one of skill in the art in possession of the present disclosure will recognize that any computing system virtualization environment will benefit from the teachings of the present disclosure and thus will fall within its scope as well.

In the illustrated embodiment, the computing system virtualization continuous authentication system 200 also includes a computing system virtualization management server device 206 that may include one or more server devices that are coupled to the computing system virtualization system 204 directly, via a network (e.g., a Local Area Network (LAN), the Internet, a management network, combinations thereof, and/or via any other networks known in the art), and/or in any other manner that would be apparent to one of skill in the art in possession of the present disclosure. For example, the computing system virtualization management server device 206 may be the IHS 100 discussed above with reference to FIG. 1, and/or may include some or all of the components of the IHS 100. In the embodiments discussed below, the computing system virtualization management server device 206 is described as a server device that is configured to provide management sessions for a network administrator to manage/provision/configure the computing system virtualization system 204. In a VDI environment, the computing system virtualization management server device 206 may provide a software interface that, for example, allows other programs to control the lifecycle of virtual machines running on physical computers on the computing system virtualization system 204. For example, the computing system virtualization management server device 206 may be a physical computer system or a virtual machine that runs computing system/desktop management software.

In an embodiment, the computing system virtualization management server device 206 may also manage pools of computer resources to run virtual machines on a cluster or set of clusters typically containing multiple server devices with CPUs, memory systems, graphics processing units (GPUs), storage devices, and communications (network) hardware. For example, the computing system virtualization management server device 206 may (a) discover computer, storage, and network resources; (b) create logical compute pools providing features like automatic CPU and memory load balancing; (c) create virtual machines with one or more virtual disks on local or shared storage (e.g., clones with full or sparse disks); (d) create virtual machines anchored to a base virtual machine; (e) monitor storage subsystems for operational parameters including, but not limited to, storage consumption of individual disks, storage consumption of virtual machines as a single unit, and virtual machine file system use (free space, total space, etc.); (f) perform power operations on virtual machines (i.e., power on, power-off, suspend, resume, checkpoint, etc.); (g) perform offline migrations of virtual disks from one datastore to another; (h) perform hot storage migration where virtual machine disks are migrated during operation of the virtual machine; (i) provide an out of band communication channel to software programs running inside the virtual machine; and/or any other computing system/desktop virtualization management functions that would be apparent to one of skill in the art in possession of the present disclosure.

In the illustrated embodiment, the computing system virtualization continuous authentication system 200 also includes a management terminal device 208 that is coupled to the computing system virtualization management server device 206 directly, via a network (e.g., a Local Area Network (LAN), the Internet, a management network, combinations thereof, and/or via any other networks known in the art), and/or in any other manner that would be apparent to one of skill in the art in possession of the present disclosure. For example, the management terminal device 208 may be provided by the IHS 100 discussed above with reference to FIG. 1, and/or may include some or all of the components of the IHS 100. In the embodiments discussed below, the management terminal device 208 is described as providing a management terminal that is displayed on end user computing devices such as a desktop computing device, a laptop/notebook computing device, a tablet computing device, a mobile phone, and/or other end user computing device that would be apparent to one of skill in the art in possession of the present disclosure. However, in other embodiments, the management terminal may be displayed on another type of computing device such as a thin client computing device that includes components configured to receive outputs from a server device and provide inputs to the server device such that most of the processing for the thin client computing device is performed at the server device.

As such, the management terminal device 208 may provide a remotely-accessible user interface to an administrator to manage the configuration of desktop pools. In one embodiment, a graphical user interface for the management terminal may be exported via hypertext transfer protocol (HTTP) and accessed by a commodity web browser. Alternatively, a command-line interface or a rich client may be provided to local or remote users. in some examples, the management terminal displayed on the management terminal device 208 may allow the administrator to perform a plurality of computing system virtualization management functions via a secure management session, with those computing system virtualization management functions including: (a) the creation of computing system/desktop pools as described herein; (b) the association of computing system/desktop pools with the computing system virtualization management server device 206; (c) the association of a computing system/desktop pool with a master image; (d) the definition of virtual machine state policies; and/or the control of other computing system virtualization management functions on the computing system virtualization management server device 206 that would be apparent to one of skill in the art in possession of the present disclosure. However, while a specific computing system virtualization continuous authentication system 200 has been illustrated and described, one of skill in the art in possession of the present disclosure will recognize that a wide variety of modification to the number, types, and configurations of the devices discussed above will remain within the scope of the present disclosure.

Figure 3:
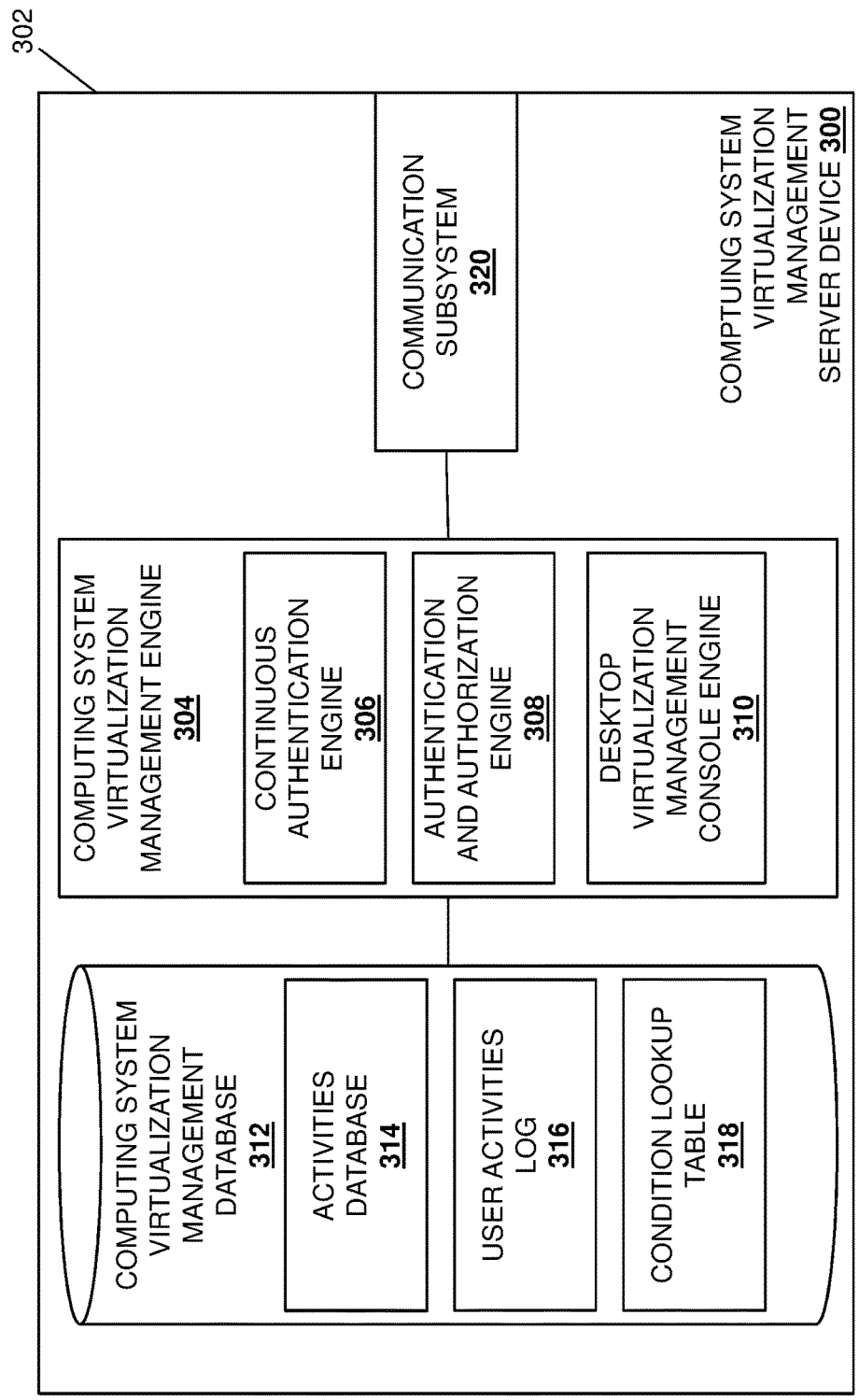
FIG. 3 is a schematic view illustrating an embodiment of a computing system virtualization management server device used in the computing system virtualization continuous authentication system of FIG. 2.

Referring now to FIG. 3, an embodiment of a computing system virtualization management server device 300 is illustrated that may provide the computing system virtualization management server device 206 discussed above with reference to FIG. 2. As such, the computing system virtualization management server device 300 may be provided by the IHS 100 discussed above with reference to FIG. 1 and/or may include some or all of the components of the IHS 100. Furthermore, while illustrated and discussed as one or more server devices, one of skill in the art in possession of the present disclosure will recognize that the functionality of the computing system virtualization management server device 300 discussed below may be provided by other devices that are configured to operate similarly as the computing system virtualization management server device 300 discussed below. In the illustrated embodiment, the computing system virtualization management server device 300 includes a chassis 302 that houses the components of the computing system virtualization management server device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a computing system virtualization management engine 304 that is configured to perform the functionality of the computing system virtualization management engines and/or the computing system virtualization management server devices discussed below. In a specific example, the computing system virtualization management engine 304 may include one more modules/engines to perform conventional computing system virtualization management functions with the computing system virtualization system 204, as well as management session functions with the management terminal such as, for example, a continuous authentication engine 306, an authentication and authorization engine 308, a computing system virtualization management console engine 310, and/or any other computing system virtualization modules/engines that would be apparent to one of skill in the art in possession of the present disclosure.

The chassis 302 may also house a storage system (not illustrated, but which may include the storage 108 discussed above with reference to FIG. 1) that is coupled to the computing system virtualization management engine 304 (e.g., via a coupling between the storage system and the processing system) and that includes a computing system virtualization management database 312 that is configured to store any of the information utilized by computing system virtualization management engine 304 discussed below. For example, the computing system virtualization management database 312 may include an activities database 314, a user activities log 316, a condition lookup table 318, and/or any other information that would be apparent to one of skill in the art in possession of the present disclosure. The chassis 302 may also house a communication system 320 that is coupled to the computing system virtualization management engine 304 (e.g., via a coupling between the communication system 320 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific computing system virtualization management server device 300 has been illustrated, one of skill in the art in possession of the present disclosure will recognize that computing system virtualization management server devices (or other devices operating according to the teachings of the present disclosure in a manner similar to that described below for the computing system virtualization management server device 300) may include a variety of components and/or component configurations for providing conventional resource monitoring and management functionality, as well as the functionality discussed below, while remaining within the scope of the present disclosure as well.

Figure 4:
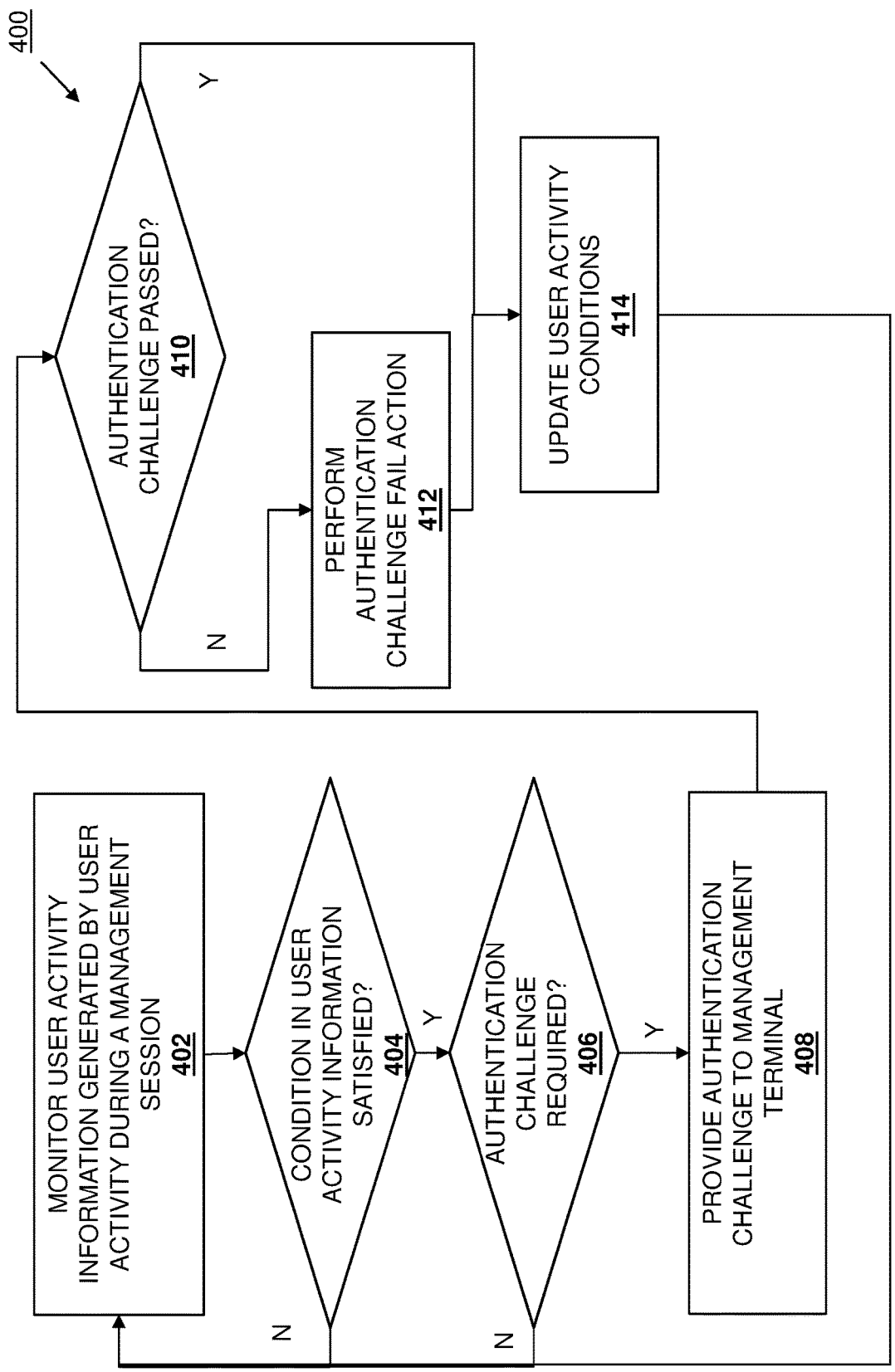
FIG. 4. is a flow chart illustrating an embodiment of a method for continuous authentication of a management session on a computing system virtualization management server device.

Referring now to FIG. 4, an embodiment of a method 400 for continuous authentication for a management session on a computing system virtualization management server device is illustrated. As discussed below, embodiments of the systems and methods of the present disclosure provide for continuous authentication of a management session to provide enhanced security for a computing system virtualization system. For example, during a management session on a computing system virtualization management server device that manages computing system virtualization on a computing system virtualization system and when a user is logged in to a user account on a computing system virtualization management server device, a continuous authentication module may monitor user activity information that is associated with the management session that corresponds with the management of the computing system virtualization system. After gathering a threshold amount of user activity information, the continuous authentication module, may determine whether an authentication challenge is required during the management session based on the user activity information to verify that the user participating in the management session is an authorized/trusted user of the user account. The continuous authentication module may have been trained or otherwise calibrated with typical behaviors of the user of the user account such that the user activity gathered is compared to those behaviors to determine whether user activity deviates from an expected behavior. If the continuous authentication module determines that an authentication challenge is required because the user activity deviates from the expected behavior, the continuous authentication module may provide an authentication challenge to the user of the management session. The authentication challenge may be different than that of an initial authentication challenge used to initially log in to the user account on the computing system virtualization management server device (e.g., as that initial authentication challenge may be compromised.) In response to the authentication challenge failing, the continuous authentication module may end the management session and, in some embodiments, lock the user account. Otherwise, the continuous authentication module may update the expected behaviors for the user when the authentication challenge has succeeded. As such, a more robust security mechanism can protect the computing system virtualization system from unauthorized users on the computing system virtualization management server device.

Figure 5:
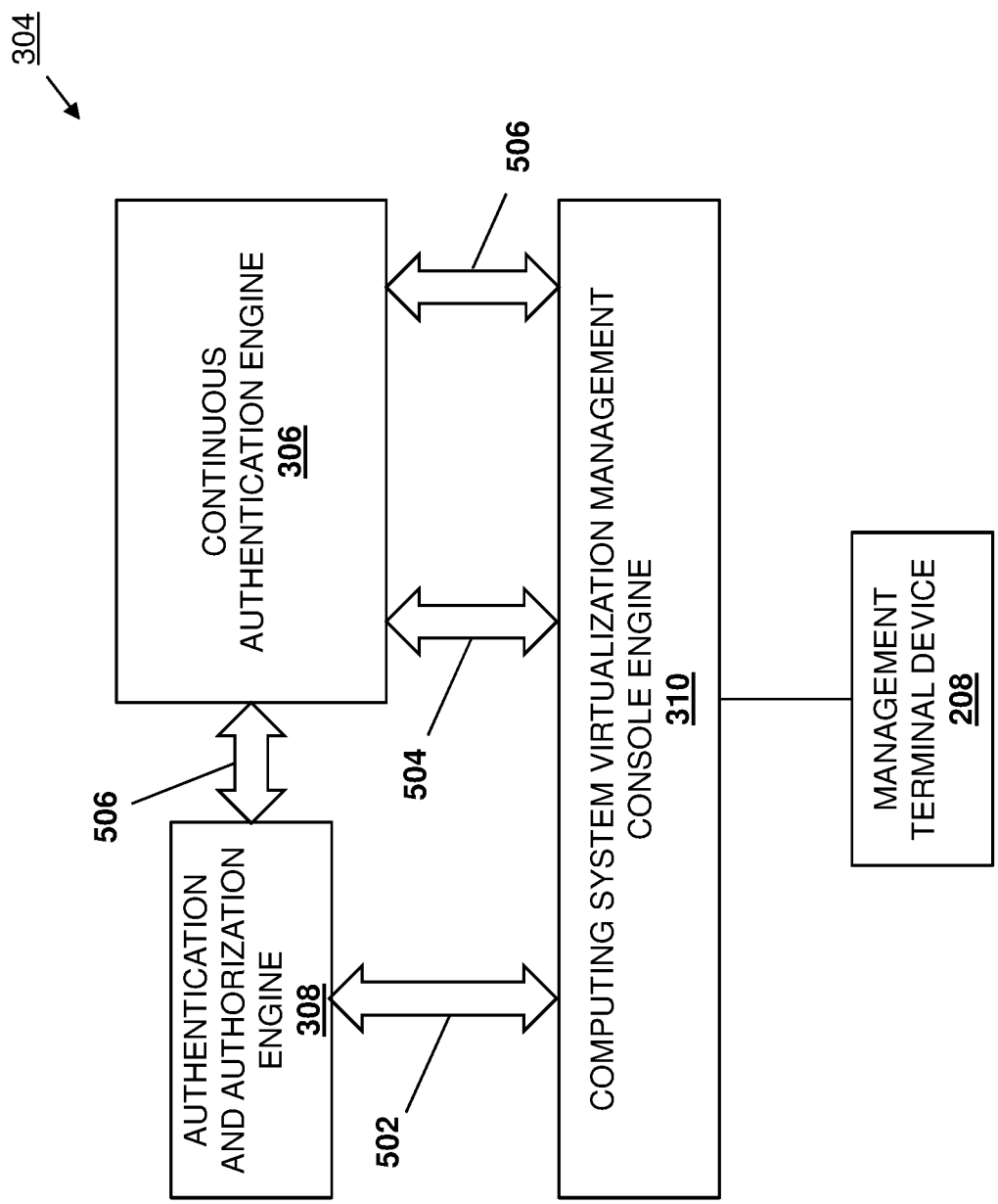
FIG. 5 is a schematic view illustrating an embodiment of data traffic in a computing system virtualization management engine in a computing system virtualization management server device during the method of FIG. 4.

The method 400 begins at block 402 where a computing system virtualization management server device monitors user activity information that is associated with a management session that corresponds with management of a computing system virtualization system. Prior to block 402, a user at the management terminal displayed on the management terminal device 208 may request access to the computing system virtualization management console engine 310 to begin a management session for the computing system virtualization system 204, and the user may interact with the authentication and authorization engine 308 to log in to a user account that has permission to use the computing system virtualization management console engine 310. For example, the authentication and authorization engine 308 may provide an authentication challenge to the user via the management terminal, with the authentication challenge requesting an authentication input such as, for example, a fingerprint input, a facial input, a retina input, a signature input, a user name/password credential input, a security question response input, and/or any other biometric and non-biometric authentication challenge inputs that would be apparent to one of skill in the art in possession of the present disclosure. In an embodiment, the authentication input received may be compared to stored authentication data to determine whether that authentication input corresponds with the store authentication data of a trusted user, and upon successfully accessing a user account by passing the authentication challenge, the user may begin a management session with the computing system virtualization management console engine 310 that corresponds with management of the computing system virtualization system 204. With reference to FIG. 5, the authentication and authorization engine 308 and the computing system virtualization management console engine 310 may communicate authentication and authorization traffic 502 between each other that includes the authentication challenge and any authentication challenge responses. The computing system virtualization management console engine 310 may also interface with the management terminal to transmit and receive the authentication and authorization traffic 502 from the computing system virtualization management engine 304 with the user.

In an embodiment, at block 402, the continuous authentication engine 306 on the computing system virtualization management server 206 may monitor user activity information generated by user activity that may include the transmission of data between the computing system virtualization management console engine 310 and the management terminal that is displayed on the management terminal device 208 during the management session. For example, with reference to FIG. 5, user activity traffic 504 may be communicated between the computing system virtualization management console engine 310 and the continuous authentication engine 306 and, in various embodiments, the continuous authentication engine 306 may monitor the user activity traffic 504 for user activities being performed on the computing system virtualization management console engine 310 that are identified in the activities database 314. As such, the activities database 314 may include a list of user activities for which the continuous authentication engine 306 may monitor. For example, the activities database 314 may include computing system virtualization management functions for which the continuous authentication engine 306 may monitor such as, for example, one or more VDI management functions that includes at least one of: a cloning technology selected for virtual computing system pool deployment (e.g., full-clone, linked-clone, or instant-clone), a virtual computing system display protocol used (e.g., Blast, Blast Extreme, Remote Desktop Protocol (RDP), or PC over IP (PCoIP)), an attachment condition of a persistent disk (e.g., attachment or non-attachment of a persistent disk), and/or any other VDI management functions or computing system/desktop virtualization management functions that are discussed above and/or that would be apparent to one of skill in the art in possession of the present disclosure. Furthermore, the user activities may include other user behavioral actions such as, for example, a time when the user logged in to the user account, a location where the user logged in to the user account, keystroke dynamics of the user at the management terminal device 208, other behaviors corresponding from inputs at the management terminal device 208 by the user, a duration of the management session, and/or any other user behavioral actions that would be apparent to one of skill in the art in possession of the present disclosure.

As the continuous authentication engine 306 monitors the user activities that are identified in the activities database 314, the continuous authentication engine 306 may gather the user activity information corresponding to the user activities and store that user activity information in the user activities log 316. as such, the user activities log 316 may store the user activities for the management session that is active. However, in some embodiments, user activity from previous management sessions for the user account may be stored in the user activities log 316 as well.

The method 400 then proceeds to decision block 404 where the computing system virtualization management server device determines whether a condition related to the user activity information is satisfied in order to proceed with a determination as to whether user activity information indicates a deviation in expected user behavior. In an embodiment, at decision block 404, the continuous authentication engine 306 may determine whether a condition related the user activity information is satisfied in order to proceed with a determination as to whether user activity information indicates a deviation in expected user behavior. For example, the continuous authentication engine 306 may determine whether sufficient user activity information is gathered to create a statistically valid hypothesis in relation to user activity patterns during the management session. Based on a desired confidence level and confidence interval a number of data points of user activity information may be required before the condition related to the user activity information is satisfied. In other examples, the condition may be a time that has lapsed since the initial login to the user account, the storage of a threshold amount of user activity information in the user activities log 316, the storage of a type or types of user activity information in the user activities log 316, and/or any other condition that would be apparent to one of skill in the art that would indicate that sufficient user activity information is gathered to create a statistically valid hypothesis in relation to user activity patterns during the management session. If, at decision block 404, it is determined that the condition in the user activity information is not satisfied, then the method 400 returns to block 402.

If, at decision block 404, the computing system virtualization management server device determines a condition in the user activity information is satisfied, the method 400 then proceeds to decision block 406 where the computing system virtualization management server device determines whether the user activity information indicates that an authentication challenge is required during the management session. In an embodiment, at decision block 406, the continuous authentication engine 306 may determine whether the user activity information indicates that an authentication challenge is required during the management session. For example, the continuous authentication engine 306 may compare the user activity information in the user activities log 316 to one or more user activity conditions in the condition lookup table 318. As such, the condition lookup table 318 may include one of more conditions such as, for example, one or more thresholds that correspond with a user activity in the activities database 314. In a specific example, the continuous authentication engine 306 may compare the current cloning technology selected for virtual computing system pool deployment to a probability that the user associated with the user profile for the management session uses that cloning technology. Thus, if there is an uncharacteristic change in cloning technology selected for virtual computing system pool deployment, then that the system may infer that the current user of the computing system virtualization management server device 206 is not a trusted user.

In various embodiments, the condition lookup table 318 may be generated during a training period or calibration period prior to the method 400. For example, when a user account is generated for the user of the computing system virtualization management server device 206, the user account may go through a period of calibration and/or training before the continuous authentication functions are implemented by the continuous authentication engine 306. During the training period, the continuous authentication engine 306 may record and store user activity information in the user activities log 316 that is associated with user activities identified in the activities database 314. Furthermore, the continuous authentication engine 306 may continue gathering user activity information until enough user activity information is gathered to create a statistically valid hypothesis in relation to normal user activity patterns, and the continuous authentication engine 306 may generate the conditions in the condition lookup table 318 that trigger the authentication challenge during a management session based on the user activity information that was received.

In various embodiments, the condition lookup table 318 derived from past user activity information may indicate that the user associated with the user account has never, or has seldom, used instant-clone cloning technology, and therefore a use of instant-clone cloning technology would indicate that the current user of the computing system virtualization management server device 206 is likely not the trusted user. However, if the condition lookup table 318 derived from past user activity information indicates that the user associated with the user account has used full-clone cloning technology 75% of the time, then a use of full-clone cloning technology would indicate that the current user of the computing system virtualization management server device 206 is likely the trusted user.

In either scenario, the continuous authentication engine 306 may generate a threshold score for each user activity in the activities database 314 and its corresponding condition in the condition lookup table 318, which can be combined proportionally or disproportionately (e.g., weighted) based on a likelihood a certain user activity indicates an unauthorized user to generate a confidence score that may be representative of the probability that the current user is the trusted user of the computing system virtualization management server device 206. For example, the confidence score may be a value within a predetermined range, such as (but not limited to) between 1 and 10, with "10" indicating the highest confidence probability and "1" indicating the lowest confidence probability. In some embodiments, the confidence score may be compared to a minimum confidence threshold, which may be a predetermined value marking the minimum acceptable probability that the current user is the trusted user of the computing system virtualization management server device 206. In the event the generated confidence score satisfies or exceeds the minimum confidence threshold such that the current user is likely the trusted user, then the method 400 may proceed back block 402.

If, at decision block 406, the computing system virtualization management server device determines that the user activity information indicates that an authentication challenge is required during the management session, the method 400 then proceeds to block 408 where the computing system virtualization management server device provides an authentication challenge to the management terminal. In an embodiment, at block 408 and with reference to FIG. 5, the continuous authentication engine 306 may communicate authentication challenge traffic 506 between the authentication and authorization engine 308 and the computing system virtualization management console engine 310. Specifically, if the continuous authentication engine 306 determines that an authentication challenge is required to re-authenticate the user due to the confidence score being below or otherwise not satisfying the minimum confidence threshold during decision block 406, then the continuous authentication engine 306 may send a re-authentication alert to the authentication and authorization engine 308 and the computing system virtualization management console engine 310. The authentication and authorization engine 308 may then provide to the management terminal displayed on the management terminal device 208 an authentication challenge. The authentication challenge may request an authentication input such as, for example, a fingerprint input, a facial input, a retina input, a signature input, a user name/password credential input, a security question response input, and/or any other biometric and non-biometric authentication challenge inputs that would be apparent to one of skill in the art in possession of the present disclosure. In many embodiments, the authentication challenge provided during re-authentication may be different than the authentication challenge that was used to initially log in the user to the user account, as that initial authentication challenge input may be compromised.

The method 400 then proceeds to decision block 410 where the computing system virtualization management server device determines whether the authentication challenge has failed. In an embodiment, at decision block 410, the authentication and authorization engine 308 may determine whether the authentication challenge has failed. For example, the authentication and authorization engine 308 may receive in the authentication challenge traffic 506 an authentication challenge input and compare that authentication challenge input to a corresponding stored authentication challenge input. If the authentication challenge input and the stored authentication challenge input match or otherwise correspond with a predetermined threshold of similarity, then the authentication challenge passes. However, if the authentication challenge input and the stored authentication challenge input do not match or otherwise do no correspond with a predetermined threshold of similarity, then the authentication challenge fails. In other examples, the authentication challenge may fail after a predetermined amount of time lapses without receiving the authentication challenge input and/or may pass or fail due to other conditions that would be apparent to one of skill in the art in possession of the present disclosure.

If, at decision block 410, the authentication challenge has failed, the method then proceeds to block 412 where an authentication challenge fail action is performed. In an embodiment, at block 412, the continuous authentication engine 306 may perform an authentication challenge fail action in response to the authentication challenge failing. For example, the continuous authentication engine 306 may cause the management session associated with the failed authentication challenge to end the management session and log the user out of the management session. In another example, the user account may be locked so that subsequent logins with the user account are not possible until the user account is unlocked by another administrator. In other examples, a security message may be provided to the authorized user of the user account via a text message, a phone call, an e-mail message, and/or any other security message that would be apparent to one of skill in possession of the present disclosure. While specific examples of authentication challenge fail actions are described, one of skill in the art in possession of the present disclosure will recognize that other authentication challenge fail actions may performed without departing from the scope of the present disclosure. The method 400 may then proceed to block 414 as discussed in more detail below.

If, at decision block 410, the authentication challenge has passed, the method 400 then proceeds to block 414 where the computing system virtualization management server device updates user activity conditions. In an embodiment, at block 414, the continuous authentication engine 306 may update the user activity conditions in the condition lookup table 318. In an embodiment, if the authentication challenge passed, the continuous authentication engine 306 may adjust one or more user activity conditions in the condition lookup table 318 to incorporate the passing of the re-authentication challenge. For example, if instant-clone cloning technology is used during the management session and the user activity conditions indicate that the use of instant-clone cloning technology has never been used by the user before such that any use of the instant-clone cloning technology would result in an authentication challenge being generated, then the passing of the authentication challenge would indicate that the user has now started using instant-clone cloning technology. As a result, the continuous authentication engine 306 may lower the weight of the user activity condition of instant-clone cloning technology such that that user activity condition may have less influence in causing an authentication challenge in the future.

In an embodiment if, at block 414, the authentication challenge failed at decision block 410, the continuous authentication engine 306 may adjust one or more user activity conditions in the condition lookup table 318 to incorporate the failing off the re-authentication challenge. For example, if a full-clone cloning technology is used during the management session and the user activity conditions indicate that the use of full-clone cloning technology was used when the authentication challenge failed, then the failing of the authentication challenge would indicate that the full-clone cloning technology may not correspond with a trusted user. As a result, the continuous authentication engine 306 may raise the weight of the user activity condition of full-clone cloning technology such that that user activity condition may have more influence in causing an authentication challenge in the future.

In an embodiment, based on the passing or failing of an authentication challenge during the management session, the continuous authentication engine 306 may include or exclude certain user activities that are identified in the activities database 314. For example, if the user of the user account associated with the management session uses a variety of virtual desktop display protocols, then the continuous authentication engine 306 may determine that user activity related to virtual display protocols is not likely going to indicate whether the user is a trusted user or an unauthorized user. Therefore, the continuous authentication engine 306 may remove that user activity from its consideration in further re-authentication determinations. In other examples, a user activity that did not correspond with an unauthorized user or a trusted user may indicate an unauthorized user or a trusted user. As such, the continuous authentication engine 306 may add that user activity to the condition lookup table 318. Therefore, the user activities in the activities database 314 and the user activity conditions in the conditions lookup table 318 may be dynamically adjusted for a particular user account on the computing system virtualization management server device 206 as the user of that user account changes their user behavior over time.

Thus, systems and methods have been described that provide for continuous authentication of a user during a management session for a computing system virtualization system. The continuous authentication may be performed by a computing system virtualization management server device that monitors user activity information generated during a management session for a computing system virtualization system. If the user activity information indicates an authentication challenge is required during the management session, then the computing system virtualization management server device may provide an authentication challenge to the management terminal through which the user is accessing the management session. If the authentication challenge fails, then the computing system virtualization management server device may end the management session and/or lock the user account to protect the computing system virtualization system from an unauthorized administrator. As such, more secure computing system virtualization management server devices may be provided that result in more secure computing system virtualization systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computing system virtualization continuous authentication system, comprising:
 a computing system virtualization system that is configured to provide a virtual computing system on a client computing device;
 a management terminal;
 a computing system virtualization management server device that is coupled to the computing system virtualization system and the management terminal and that is configured to:
  begin a management session via the management terminal with an authenticated user account that was authenticated on the computing system virtualization management server;
  monitor computing system virtualization management functions used by the authenticated user account in the management session during the management of the computing system virtualization system;
  determine that a first authentication challenge is required during the management session based on at least one of the computing system virtualization management functions used by the authenticated user account in the management session during the management of the computing system virtualization system; and
  provide the first authentication challenge to the management terminal.

2. The system of claim 1, wherein the computing system virtualization management server device is configured to:
 determine that the first authentication challenge has failed; and
 end the management session in response to determining that the first authentication challenge has failed.

3. The system of claim 1, wherein the computing system virtualization management server device is configured to:
 continue to monitor the computing system virtualization management functions used by the authenticated user account in the management session during the management of the computing system virtualization system.

4. The system of claim 1, wherein the at least one of the computing system virtualization management functions upon which the requirement for the first authentication challenge is based is a Virtual Desktop Infrastructure (VDI) management function that includes a cloning technology selected for virtual computing system pool deployment.

5. The system of claim 1, wherein the at least one of the computing system virtualization management functions upon which the requirement for the first authentication challenge is based is a Virtual Desktop Infrastructure (VDI) management function that includes a virtual computing system display protocol used.

6. The system of claim 1, wherein the computing system virtualization management server device is further configured to:
 determine that the computing system virtualization management functions that have been monitored haves satisfied a condition prior to the determining that the first authentication challenge is required based on the computing system virtualization management functions.

7. The system of claim 1, wherein the determining that the first authentication challenge is required based on the computing system virtualization management functions used by the authenticated user account in the management session during the management of the computing system virtualization system includes:
 determining whether one or more conditions that are generated during a training process are satisfied.

8. The system of claim 1, wherein the first authentication challenge is different than a second authentication challenge that was used to authenticate a user and to access the authenticated user account to begin the management session.

9. An Information Handling System (IHS), comprising:
 a processing system; and
 a memory system that is coupled to the processing system and that includes instructions that, when executed by the processing system, cause the processing system to provide a computing system virtualization management engine that is configured to:
 begin a management session with an authenticated user account via a management terminal that is coupled to the processing system;
 monitor computing system virtualization management functions used by the authenticated user account in the management session during the management of a computing system virtualization system that is coupled to the processing system;
 determine that a first authentication challenge is required during the management session based on at least one of the computing system virtualization management functions used by the authenticated user account in the management session during the management of the computing system virtualization system; and
 provide the first authentication challenge to a management terminal coupled to the processing system.

10. The IHS of claim 9, wherein the computing system virtualization management engine is configured to:
 determine that the first authentication challenge has failed; and
 end the management session in response to determining that the first authentication challenge has failed.

11. The IHS of claim 9, wherein the computing system virtualization management engine is configured to:
 continue to monitor the computing system virtualization management functions used by the authenticated user account in the management session during the management of the computing system virtualization system.

12. The IHS of claim 9, wherein the at least one of the computing system virtualization management functions upon which the requirement for the first authentication challenge is based is a Virtual Desktop Infrastructure (VDI) management function that includes a cloning technology selected for virtual computing system pool deployment.

13. The IHS of claim 9, wherein the
 at least one of the computing system virtualization management functions upon which the requirement for the first authentication challenge is based is a Virtual Desktop Infrastructure (VDI) management function that includes a virtual computing system display protocol used.

14. The IHS of claim 9, wherein the determining that the first authentication challenge is required based on the computing system virtualization management functions used by the authenticated user account in the management session during the management of the computing system virtualization system includes:
 determining whether one or more conditions that are generated during a training process are satisfied.

15. The IHS of claim 9, wherein the first authentication challenge is different than a second authentication challenge that was used to authenticate a user and to access the authenticated user account to begin the management session.

16. A method of continuous authentication of a management session for a computing system virtualization system, comprising:
 beginning, by a computing system virtualization management server device, a management session with an authenticated user account via a management terminal that is coupled to the processing system computing system virtualization management server device;
 monitoring, by the computing system virtualization management server device, computing system virtualization management functions used by the authenticated user account in the management session during the management of a computing system virtualization system;
 determining, by the computing system virtualization management server device, that a first authentication challenge is required during the management session based on at least one of the computing system virtualization management functions used by the authenticated user account in the management session during the management of the computing system virtualization system; and
 providing, by the computing system virtualization management server device, first authentication challenge to the management terminal.

17. The method of claim 16, further comprising:
 determining, by the computing system virtualization management server device, that the first authentication challenge has failed; and
 ending, by the computing system virtualization management server device, the management session in response to determining that the first authentication challenge has failed.

18. The method of claim 16, further comprising:
 continuing, by the computing system virtualization management server device, to monitor the computing system virtualization management functions used by the authenticated user account in the management session during the management of the computing system virtualization system.

19. The method of claim 16, wherein the at least one of the computing system virtualization management functions upon which the requirement for the first authentication challenge is based is a Virtual Desktop Infrastructure (VDI) management function that includes a cloning technology selected for virtual computing system pool deployment.

20. The method of claim 16, wherein the at least one of the computing system virtualization management functions upon which the requirement for the first authentication challenge is based is a Virtual Desktop Infrastructure (VDI) management function that includes a virtual computing system display protocol used.

* * * * *